United States Patent
Delorme et al.

(10) Patent No.: US 6,813,667 B2
(45) Date of Patent: Nov. 2, 2004

(54) BUS EXTENDER AND FORMATTER APPARATUS AND METHODS

(75) Inventors: Alexandre P. V. Delorme, Boulder, CO (US); Darwin Mitchel Hanks, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 491 days.

(21) Appl. No.: 09/947,812

(22) Filed: Sep. 5, 2001

(65) Prior Publication Data

US 2003/0046466 A1 Mar. 6, 2003

(51) Int. Cl.[7] .............................................. G06F 13/00
(52) U.S. Cl. ...................... 710/300; 710/52; 709/245; 370/916
(58) Field of Search .................. 710/300, 315, 710/100, 52, 313, 62, 316; 375/295, 316; 340/825.52; 709/253; 235/375; 370/359, 916

(56) References Cited

U.S. PATENT DOCUMENTS

| | | | | |
|---|---|---|---|---|
| 4,296,403 A | * | 10/1981 | Haensel | 340/825.52 |
| 4,932,040 A | * | 6/1990 | Barlow | 375/362 |
| 5,274,783 A | * | 12/1993 | House et al. | 710/300 |
| 5,596,562 A | * | 1/1997 | Chen | 710/315 |
| 5,881,247 A | * | 3/1999 | Dombrosky et al. | 710/100 |
| 6,226,700 B1 | | 5/2001 | Wandler et al. | |

FOREIGN PATENT DOCUMENTS

| | | |
|---|---|---|
| EP | 0520838 A2 | 6/1992 |
| EP | 0661637 A1 | 12/1994 |
| EP | 0723232 A1 | 1/1995 |
| EP | 0801352 A2 | 10/1997 |
| EP | 0917065 A2 | 5/1999 |
| WO | WO 2001/82090 | 11/2001 |

OTHER PUBLICATIONS

"Fast single–element PN acquisition for the TDRSS MA system" by Davisson, L.D. and Flikkema, P.G. (abstract only).*

"An adaptive architecture for monitoring and failure analysis of high–speed networks" by Floering, B.; Brothers, B.; Kalbarczyk, Z.; Iyer, R. (abstract only).*

U.K. Patent Office Search Report dated Mar. 21, 2003, in corresponding U.K. patent application No. GB 0220081.4.

* cited by examiner

Primary Examiner—Gopal C. Ray (57) ABSTRACT

An apparatus and method for extending a bus to support at least one auxiliary function. A filter may intercept and route a signal issued over the bus. The filter may comprise control logic for reading the intercepted signal and for determining a destination therefor. The filter may also comprise a multiplexer operatively associated with the control logic for reissuing the intercepted signal to the destination. When the intercepted signal is designated as function-specific, the multiplexer reissues the intercepted signal to one of the at least one auxiliary function. When the intercepted signal is designated as device-specific, the multiplexer reissues the intercepted signal over the bus to a peripheral device.

17 Claims, 8 Drawing Sheets

BUS EXTENDER AND FORMATTER APPARATUS AND METHODS

FIELD OF THE INVENTION

The invention generally pertains to computer buses, and more specifically, to apparatus and methods for extending a bus to support at least one auxiliary function.

BACKGROUND OF THE INVENTION

Peripheral devices are commonly provided to extend the functionality of a personal computer (PC). For example, a Digital Video Disk/Re-Writable (DVD+RW) drive may be used for video storage and retrieval using the PC. Some peripheral devices are more useful when accompanied by an auxiliary function. For example, a DVD+RW drive may be accompanied by a video capture and compression function for creating a DVD from analog audio and video input. That is, the video capture function may convert analog audio and video input (e.g., from a video camcorder) to digital output. The compression function may compress the digital output (e.g., using International Organization for Standardization (ISO) Moving Picture Experts Group (MPEG) file compression standards) for writing to the DVD using the DVD+RW drive. Other functions may include DVD software authoring (e.g., adding a navigation menu, editing the video or audio), etc.

A PC is typically provided with only a limited number of busses and connections thereto. For example, an Advanced Technology Attachment (ATA) bus supports a maximum of two single-function ATA devices for each host controller port. Where two ATA devices are present on a single ATA bus, one of the ATA devices is required to be configured as a master device, and the other device is required to be configured as a slave device. Furthermore, a PC is typically provided with only two ATA host controllers, thus limiting the number of devices supported thereon to four. In addition, the ATA bus was originally developed for connecting hard disk drives to PCs. The ATA bus has since evolved into the universal interface for supporting storage devices, and is now commonly used to connect CD-ROM drives, DVD drives, etc. However, the ATA bus is still typically limited to supporting storage devices (e.g., the DVD+RW drive). The auxiliary function may not necessarily be storage (e.g., the video capture and compression function discussed above). Therefore, these auxiliary functions are not supported by the ATA bus and must instead be linked to the PC via a separate bus.

As an illustration, the auxiliary function may be provided by a Peripheral Component Interconnect (PCI) expansion board or card. However, installing both a peripheral device (e.g., the DVD+RW drive) and a separate PCI expansion board (e.g., the video capture and compression function) may be a daunting task for the typical PC user. As such, some users may be dissuaded from purchasing a product that requires such installation. In addition, a PC typically only has a limited number of (e.g., three or four) PCI connectors or slots. These may already be occupied by other PCI expansion boards (e.g., a graphics accelerator, a sound card, a modem card, etc.). Likewise, installing the auxiliary function as a PCI expansion board reduces the availability of PCI connectors for later-installed PCI expansion boards.

SUMMARY OF THE INVENTION

Apparatus for extending a bus to support at least one auxiliary function. A filter may be provided for intercepting and routing a signal issued over the bus. The filter may comprise control logic for reading the intercepted signal and for determining a destination therefor. The filter may also comprise a multiplexer operatively associated with the control logic for reissuing the intercepted signal to the destination. The multiplexer reissues the intercepted signal to one of the at least one auxiliary function when the intercepted signal is designated as function-specific. Alternately, the multiplexer reissues the intercepted signal over the bus to a peripheral device when the intercepted signal is designated as device-specific.

A method for extending a bus to support at least one auxiliary function may comprise: intercepting a signal issued over the bus, reissuing the intercepted signal to one of the at least one auxiliary function when the intercepted signal is designated as function-specific, and reissuing the intercepted signal over the bus to the peripheral device when the signal is designated as device-specific.

BRIEF DESCRIPTION OF THE DRAWINGS

Illustrative and presently preferred embodiments of the invention are illustrated in the drawings, in which.

DESCRIPTION OF THE PREFERRED EMBODIMENT

Apparatus 10 (e.g., FIG. 2) for extending a bus 130 for interfacing between a host 120 and a peripheral device 100 to support at least one auxiliary function 110 is shown and described herein. Briefly, the ATA specification is defined as an American National Standards Institute (ANSI) standard. The integrated drive electronics (IDE) controller for the bus 130 supports two peripheral devices per channel. The two peripheral devices may be configured as a master device (e.g., 100) and a slave device (e.g., 105). The enhanced IDE (E-IDE) controller supports four devices by further separating the ATA bus into a primary bus 130 and a secondary bus 135. Most PCs have a primary ATA bus 130 and a secondary ATA bus 135 as part of the motherboard (not shown). An additional dual channel ATA host adapter (not shown) may be added to most PCs 125 using an expansion board or card. In any event, each ATA bus 130, 135 still only supports a maximum of two single function peripheral devices 100, 105 (i.e., the master device and the slave device) for each host controller port.

However, peripheral devices 100 may be accompanied by auxiliary functions 110 to further enhance the functionality of the PC 125. For example, a DVD+RW drive may be accompanied by associated functions such as video capture and compression functions for creating DVDs. Although these auxiliary functions 110 may be included on an expansion board or card (e.g., PCI expansion board 115 in FIG. 1), expansion connections in PCs 125 are also typically limited in number. Therefore, there is a desire to extend the ATA bus to support both the peripheral device and the auxiliary function. The present invention relates to such a method and apparatus for extending a bus 130, 135 for interfacing between a host 120 and a peripheral device 100 to support at least one auxiliary function 110.

Figure 5:
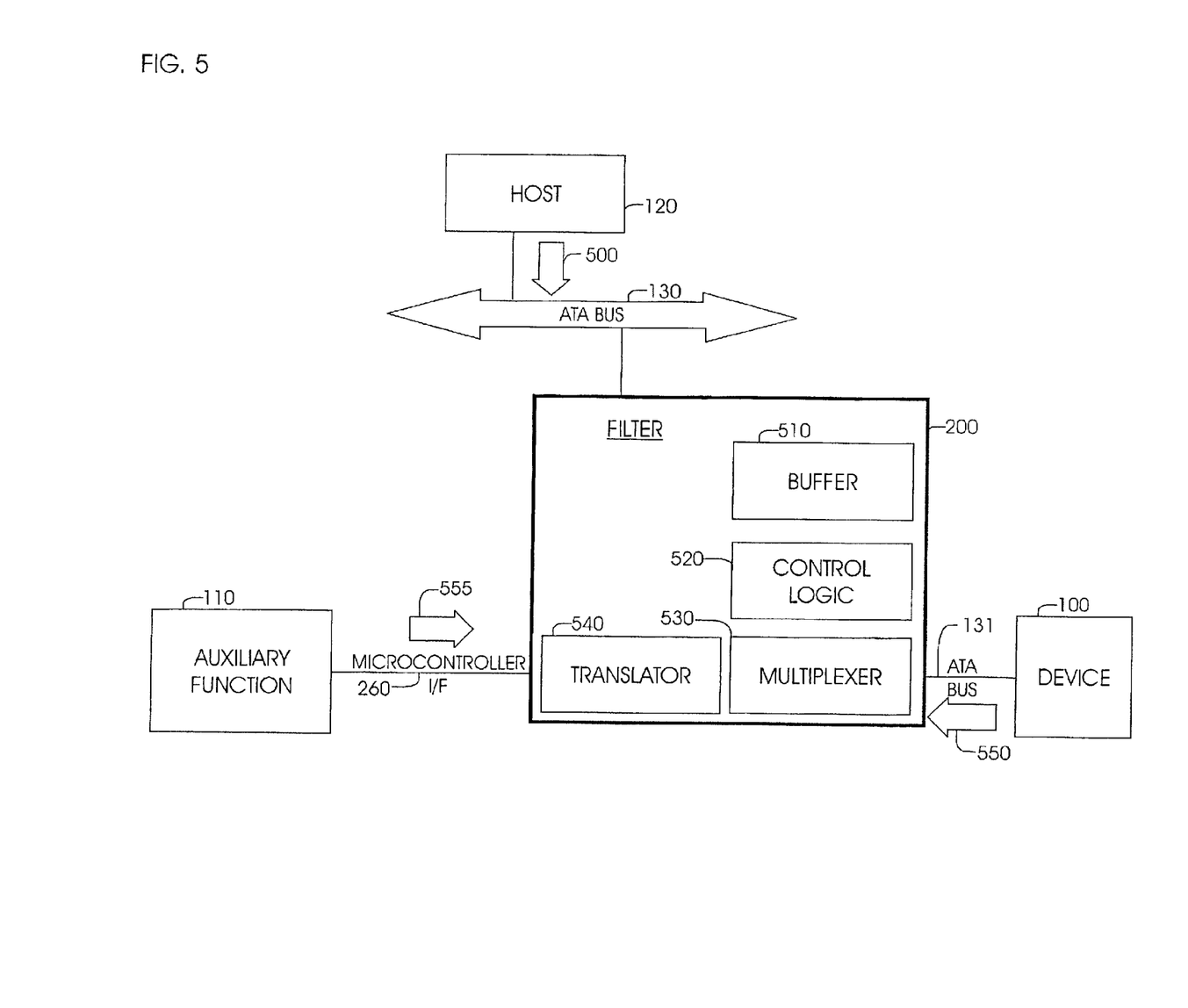
FIG. 5 is a high level diagram illustrating an embodiment of a filter for extending a bus for interfacing between a host and a peripheral device to support at least one auxiliary function.

According to the teachings of the invention, a filter 200 (FIG. 5) may be provided for extending a bus 130 for interfacing between a host 120 and a peripheral device 100 to support at least one auxiliary function 110. The filter 200 intercepts and routes a signal 500 issued by the host 120 over the bus 130. For example, the signal 500 may be stored in a buffer 510. The filter may comprise control logic 520 for reading the intercepted signal 500 (e.g., an operation code 610 in FIG. 6), and determining a destination for the intercepted signal 500 (FIG. 5). That is, the signal 500 (e.g., having a function-specific operation code 610) may be intended for an auxiliary function 110. Alternately, the signal 500 (e.g., having a device-specific command code 720) may be intended for the peripheral device 100. The filter 200 may further comprise a multiplexer 530 operatively associated with the control logic 520. The multiplexer 530 may reissue the intercepted signal 500 to one of the auxiliary functions 110 (e.g., when the operation code 610 is function-specific). Alternately, the multiplexer 530 may reissue the intercepted signal 500 over the bus 130 to the peripheral device 100 (e.g., when the operation code 610 is device-specific).

The apparatus 10 may be operated as follows. A signal 500 (FIG. 5) issued by the host 120 over the bus 130 may be intercepted by the filter 200. The intercepted signal 500 may be reissued to one of the auxiliary functions 110 when the signal 500 is designated as function-specific. Alternately, the intercepted signal 500 may be reissued over the bus 131 to the peripheral device 100 when the signal 500 is designated as device-specific. As such, the bus 130 for interfacing between a host 120 and a peripheral device 110 may be extended to support at least one auxiliary function 110.

Although a bus may be otherwise limited to the number of peripheral devices it supports, according to the invention, the bus 130, 135 may be extended to support at least one auxiliary function 110. The auxiliary function(s) 110 may be independently accessible across the same connection or bus 130, 135, while appearing to the host 120 as a single, valid peripheral device 100. According to this configuration, a single ATA connection (master or slave) typically supporting only a single-function device 100 is extended to support both the single-function device 100 and one or more auxiliary functions 110. Also according to the invention, the hardware for both the auxiliary function 110 and the peripheral device 100 may be housed together. In addition, the invention only requires a single bus connection. The integrated device is thus cost-effective to manufacture, and easy to install.

Having generally described apparatus 10 and methods for extending a bus for interfacing between a host and a peripheral device to support at least one auxiliary function, various embodiments of the invention will now be described in further detail.

Figure 1:
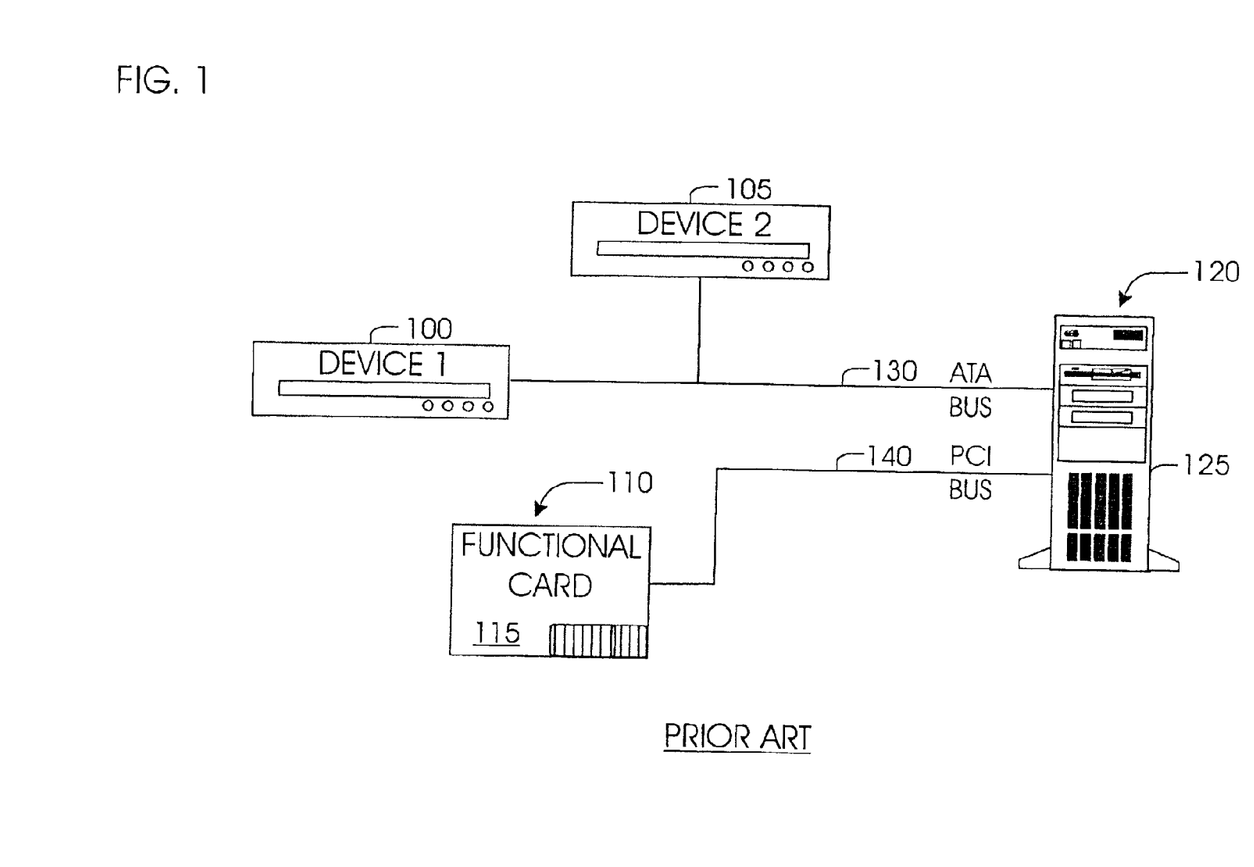
FIG. 1 is a high-level diagram illustrating a prior art embodiment for linking both a peripheral device and an auxiliary function to a host.

FIG. 1 is a high-level diagram illustrating a prior art embodiment for linking both a peripheral device 100 and an auxiliary function 110 to a host 120. In this embodiment, a first peripheral device 100 (e.g., a DVD+RW drive), and optionally a second peripheral device 105 (e.g., a hard disk drive), are linked to the host 120 (e.g., a PC 125) via an ATA bus 130 (e.g., as either a master or a slave device). As the ATA bus 130 may only support the two storage devices 100, 105 thereon, the auxiliary function 110 (e.g., the video capture and compression function) is provided separately on a functional card 115 (e.g., a PCI expansion board) and linked to the host via a PCI bus 140. According to this embodiment, the user must separately install both the peripheral device 100 and the auxiliary function 110 (e.g., the functional card 115) by connecting both to the PC 125. In addition, a PCI connector on the PC 125 is occupied thereby, or other PCI expansion boards (e.g., a graphics accelerator, a sound card, etc.) may already occupy the PCI connectors or slots on the PC 125.

Figure 2:
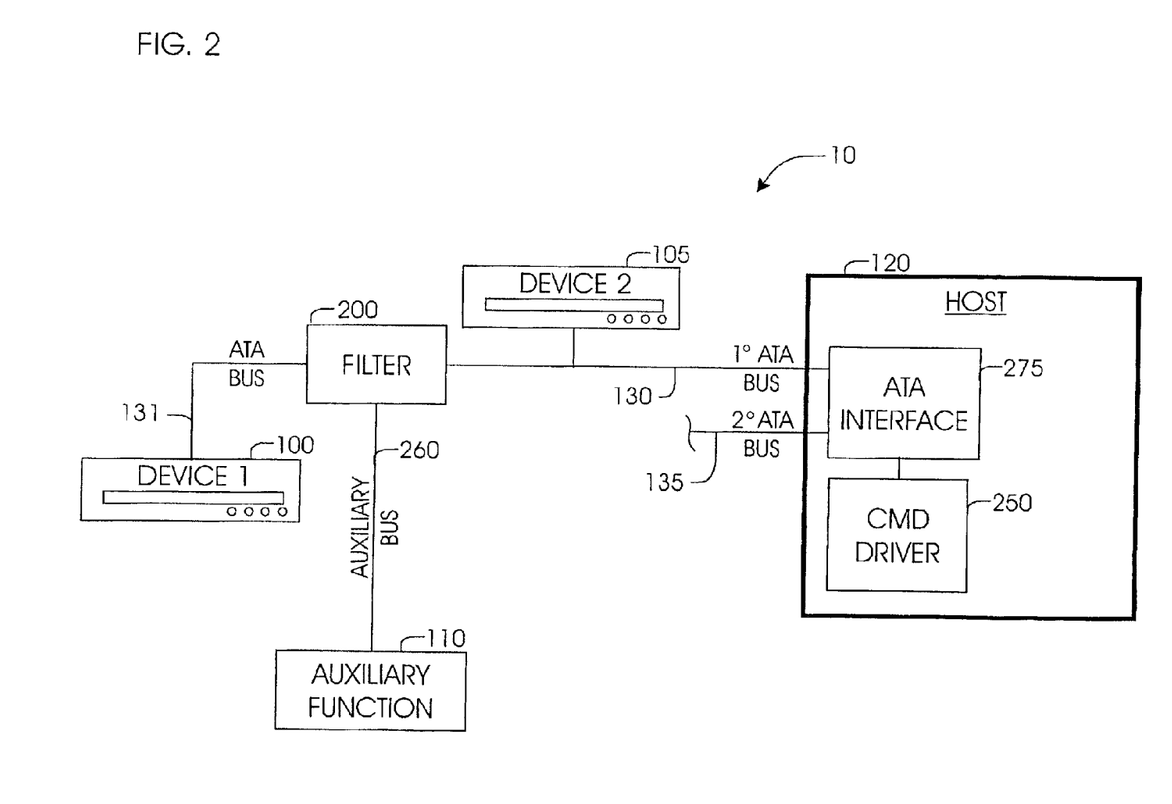
FIG. 2 is a high-level diagram illustrating an embodiment for extending a bus for interfacing between a host and a peripheral device to support at least one auxiliary function.

FIG. 2 is a high-level diagram illustrating an embodiment of an apparatus 10 of the invention for extending a bus 130, 135 for interfacing between a host 120 and a peripheral device 100, 105 to support at least one auxiliary function 110. A command driver 250 at the host 120 designates a signal (e.g., 500 in FIG. 5) as function-specific or device-specific, as explained in more detail below. The signal 500 is passed to an ATA interface 275, and issued over the bus 130.

Preferably, the bus 130 adheres to the Advanced Technology Attachment (ATA) standard and variations thereof (ATA-1, ATA-2, ATA-3, etc.), including, but not limited to, the ATA Packet Interface (ATAPI) standard and variations thereof (ATA/ATAPI-4, ATA/ATAPI-5, etc.). As such, any standard peripheral device adhering to the ATA standard, provided by various manufacturers, may be used according to the teachings of the invention. However, it is understood that other suitable busses 130 are considered as being within the scope of the invention, such as the small computer system interface (SCSI) bus.

A filter 200 may be provided on the bus 130 to intercept and route the signal 500 issued by the host 120 over the bus 130 to its destination. That is, the intercepted signal 500 may be read by the filter 200 and the destination of the signal 500 determined. The signal 500 may be designated as device-specific (e.g., based on the operation code 610, shown in FIG. 6), and thus the destination of the signal 500 is the peripheral device 100. Accordingly, the intercepted signal 500 may be reissued over the ATA bus 131 to the peripheral device 100 when the signal 500 is so designated. Alternately, the signal 500 may be designated as function-specific (e.g., based on the operation code 610, in FIG. 6), and thus the destination of the signal 500 is the auxiliary function 110. Accordingly, the intercepted signal 500 may be reissued to the auxiliary function 110 over an auxiliary bus 260 (e.g., a microcontroller bus) when the signal 500 is so designated.

It is understood that although the invention is illustrated herein as it may be implemented using a PC (e.g., 125), the invention is not limited to use with PCs. The host 120 may be, but is not limited to, a desktop PC, a laptop, a network workstation, a network server, a stand-alone device, or any other suitable host now known or later developed. In addition, it is understood that although the invention is illustrated herein as it may be implemented using a microcontroller bus, the auxiliary function 110 may be linked via the filter 200 to the ATA bus 130 by any suitable auxiliary data bus 260, such as an Integrated Drive Electronics (IDE) bus, parallel bus, memory bus, etc.

It is also understood that although the invention is illustrated herein as it may be implemented for a DVD+RW drive, the peripheral device 100 may be any suitable ATA device. For example, the peripheral device 100 may be a mass storage device, an optical device, a tape drive, a zip drive, etc. Likewise, although the invention is illustrated herein as it may be implemented for video capture and compression functions, the auxiliary function 110 may be any suitable function. For example, the auxiliary function 110 may be any suitable data device, such as, a measurement probe, an audio source, an information capture device, a storage device, etc. Indeed, the auxiliary function 110 may itself be an ATA/ATAPI device, wherein the auxiliary bus 260 is also preferably an ATA bus. As such, two or more ATA devices may be connected to a single ATA/ATAPI connection (e.g., both to the master connection or both to the slave connection). In such an embodiment, the ATA devices are preferably configured so as not to conflict with one another.

Figure 3:
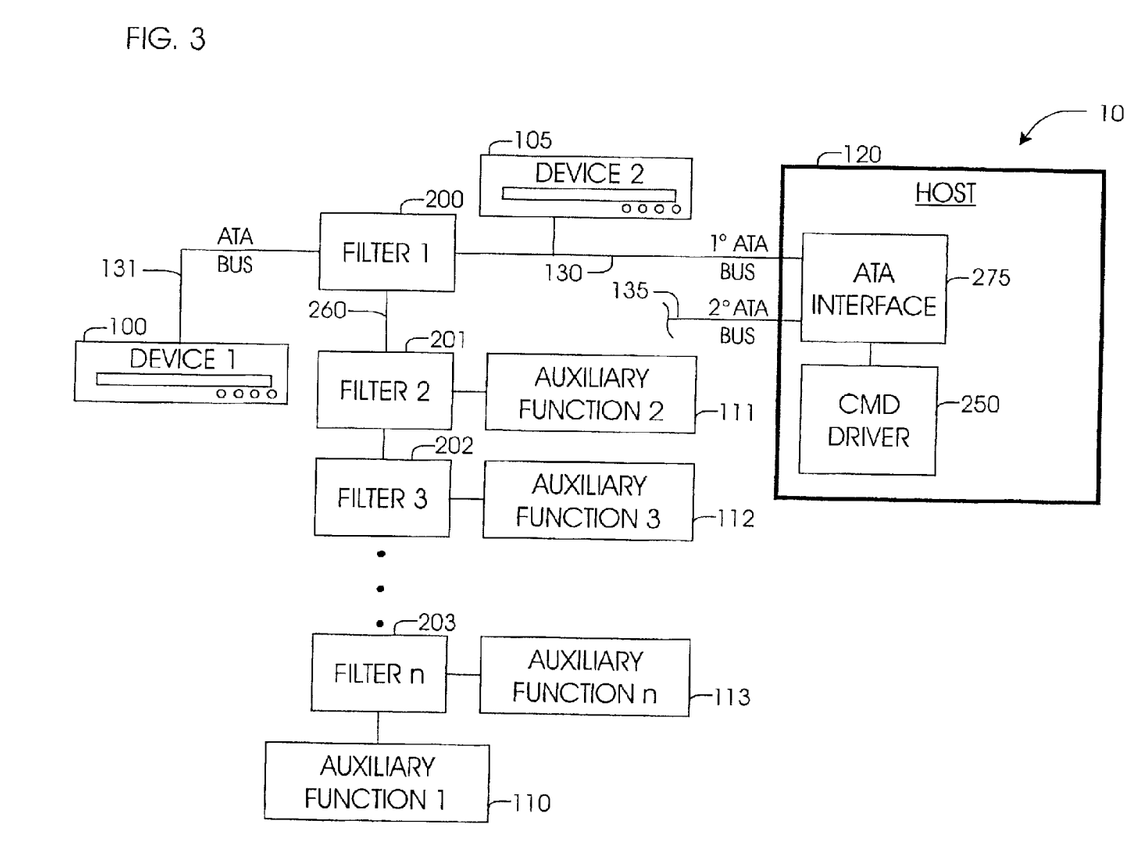
FIG. 3 is a high-level diagram illustrating another embodiment for extending a bus for interfacing between a host and a peripheral device to support at least one auxiliary function.
Figure 4:
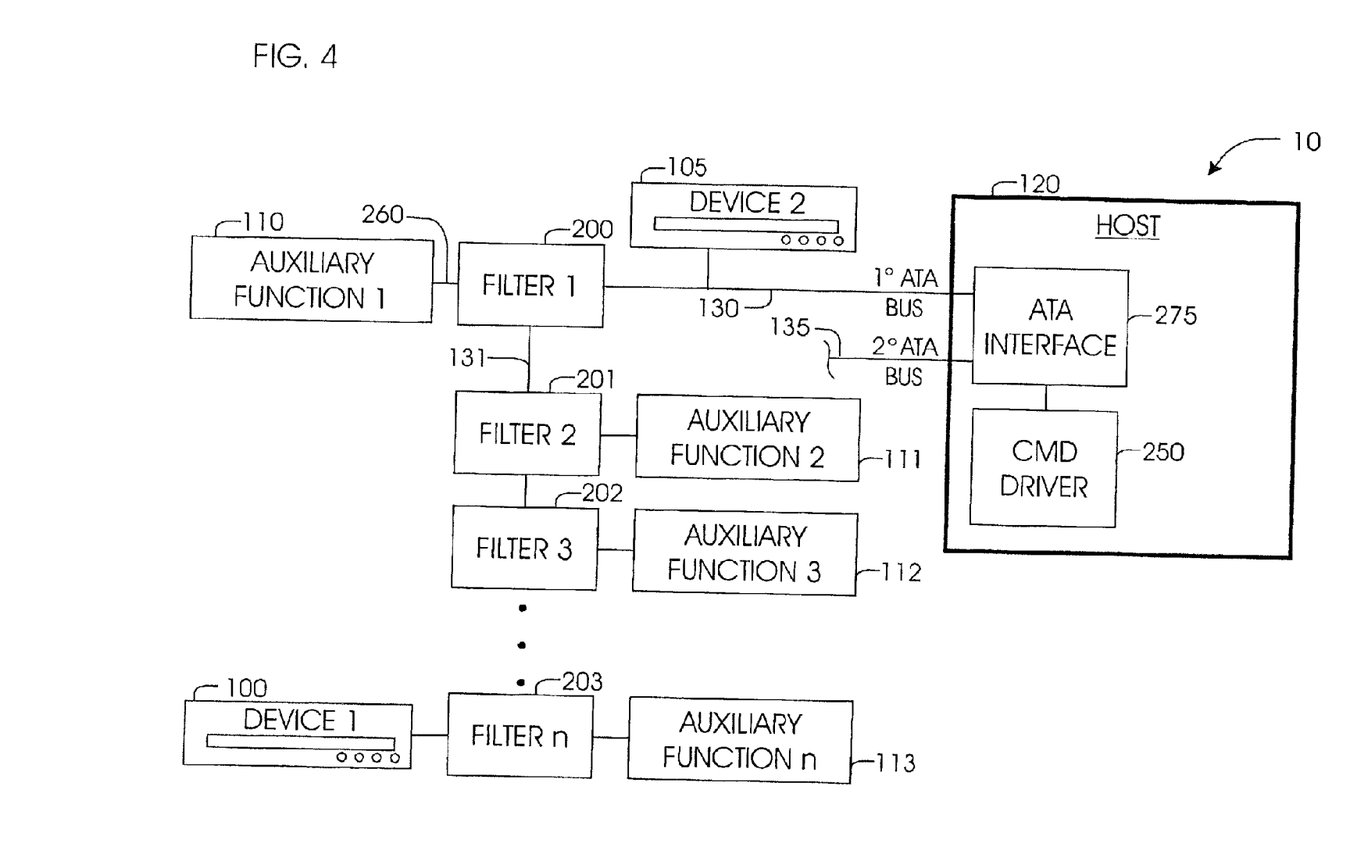
FIG. 4 is a high-level diagram illustrating yet another embodiment for extending a bus for interfacing between a host and a peripheral device to support at least one auxiliary function.

It is further understood that the peripheral device may be configured as a master device 100 (as shown in FIG. 2, FIG. 3, and FIG. 4), or the peripheral device may be configured as a slave device 105. As such, the filter 200 may be so configured to intercept signals 500 issued to the master device 100 or to the slave device 105. Indeed, one or more filters 200 may be provided to intercept signals 500 issued to the master device 100 and to the slave device 105. Furthermore, any number of auxiliary functions 110 may be provided according to the teachings of the invention, as further illustrated below with respect to FIG. 3 and FIG. 4.

FIG. 3 is a high-level diagram illustrating another embodiment for extending a bus 130 for interfacing between a host 120 and a peripheral device 100 to support at least one auxiliary function 110. Again, the command driver 250 may designate the destination for the signal 500 (FIG. 5). The signal 500 may be passed to the ATA interface 275, where it is issued over the bus 130. Again, preferably, the bus 130 adheres to the ATA standard and variations thereof, including, but also not limited to, the ATAPI standard and variations thereof.

In the embodiment shown in FIG. 3, a plurality of filters 200–203 may be provided, preferably in series along the auxiliary bus 260, to intercept and route the signal 500 to the peripheral device 100 or to one of a plurality of auxiliary functions 110–113. In this embodiment, the signal 500 may be intercepted by the first filter 200 (i.e., Filter 1). The signal 500 is preferably designated with the intended destination. That is, the signal 500 may be designated as device-specific, indicating that the signal 500 is intended for the peripheral device 100. Alternately, the signal 500 may be designated as function-specific for one of the auxiliary functions 110–113.

Again, when the signal 500 is designated as device-specific, the intercepted signal 500 may be reissued over the ATA bus 131 to the peripheral device 100. Alternately, the intercepted signal 500 may be reissued over the auxiliary bus 260 (e.g., a microcontroller bus) to one of the auxiliary functions 110–113 when the signal 500 is so designated. According to this embodiment, a second filter 201 (e.g., Filter 2) intercepts the signal 500 reissued over the auxiliary bus 260, and the second filter 201 determines a destination for the signal 500. Where the signal 500 is designated as function-specific for a second auxiliary function 201 (e.g., Auxiliary Function 2), the signal 500 is reissued to the second auxiliary function 111. Alternately, where the signal 500 is designated as function-specific for another auxiliary function (e.g., 110, 112, or 113), the signal 500 is reissued over the auxiliary bus 260 to the next filter 202 (e.g., Filter 3), and so forth until the signal 500 is received at a destination (i.e., an auxiliary function 110–113).

In the embodiment shown in FIG. 4, a plurality of filters 200–203 may be provided in series along the ATA bus 130 to intercept and route the signal 500 (FIG. 5) to the peripheral device 100 or to one of a plurality of auxiliary functions 110–113. Again, the signal 500 is preferably designated as device-specific (i.e., for the peripheral device 100), or function-specific (i.e., for one of the auxiliary functions 110–113).

The intercepted signal 500 may be reissued over the auxiliary bus 260 (e.g., a microcontroller bus) to an auxiliary function 110 when the signal 500 is designated as function-specific for a particular auxiliary function 110 (e.g., Auxiliary Function 1). Otherwise, the intercepted signal 500 may be reissued over the ATA bus 131 to the peripheral device 100. According to this embodiment, the signal reissued over the ATA bus 131 may be intercepted by a second filter 201 (e.g., Filter 2). Where the signal 500 is designated as function-specific for a second auxiliary function 111 (e.g., Auxiliary Function 2), the signal 500 is reissued to the second auxiliary function 111. Otherwise, the signal 500 is again reissued over the ATA bus 131, and so forth until the signal 500 is received at a destination (i.e., an auxiliary function 110–113 or a peripheral device 100).

It is understood that the signal 500 may be reissued to an auxiliary function (e.g., 110) or a peripheral device 100 by default. For example, where the signal 500 is not designated as function-specific for one or more auxiliary functions linked to the filter 200, the signal 500 may be reissued by the filter 200 without any further determination by the filter as to the ultimate destination of the signal 500.

It is further understood that the embodiments shown in FIG. 3 and FIG. 4 are merely exemplary of hardware architectures for a plurality of filters. However, the filters 200–203 need not be provided as separate and distinct hardware. One or more individual filters 200 may support a plurality of functions 110–113. For example, one or more of the hardware components (e.g., control logic 520, multiplexer 530, in FIG. 5) of the plurality of filters 200–203 may be combined as a single hardware circuit. Or for example, a single multiplexer 530 may be provided with different outputs to the various functions 110–113. Likewise, the filters 200–203 need not be linked to one another in series, and may be linked in parallel, or a combination thereof when implemented as a single hardware circuit. Indeed, the filters 200–203 need not be linked by the auxiliary bus 140 or the ATA bus 131, and may instead be linked by other suitable circuitry.

FIG. 5 is a high-level diagram illustrating an embodiment of a filter 200 for extending a bus 130 for interfacing between a host 120 and a peripheral device 100 to support at least one auxiliary function 110. As explained above, the host 100 may issue a signal 500 over the bus 130. The filter 200 intercepts the signal 500, preferably storing the signal 500 to a buffer 510. The filter 200 also preferably comprises control logic 520 operatively associated with the buffer 510 for reading the signal 500, and for determining a destination for the signal 500. For example, where the signal 500 is designated (e.g., by operation code 610 in FIG. 6) as device-specific, a multiplexer 530 reissues the signal 500 over the bus 131 to the peripheral device 100. Where the signal 500 is designated (e.g., by operation code 610 in FIG. 6) as function-specific, the multiplexer 530 reissues the signal 500 to the auxiliary function 110 (e.g., over the auxiliary bus 260).

Preferably, the filter 200 also comprises a translator 540 operatively associated with the multiplexer 530. As such, when the signal 500 is reissued by the multiplexer 530 to the auxiliary function 110, the signal 500 may be formatted by the translator 540 for the auxiliary bus 260. Once formatted, the signal 500 is reissued over the auxiliary bus 260 to the auxiliary function 110.

The embodiment of the filter 200 shown in FIG. 5, and described with respect thereto, is merely illustrative of the functional aspects thereof, and is not intended to limit the scope of the invention thereto. It is understood that the filter 200 may take any suitable form. For example, the filter 200 may comprise a Field-Programmable Gate Array (FPGA) logic chip or other gate array, an Application Specific Integrated Circuit (ASIC), a microcontroller, state meshing hardware, etc. The hardware specifications for the filter 200 may depend on design considerations, such as manufacturing cost, size, production volume, signal latency requirements, among other considerations.

In addition, it is understood that each of the multiple filters 200–203 (FIG. 3 and FIG. 4) may also have similar architecture. Alternately, one or more multiplexers 530 may be provided as part of a single filter 200 to support a plurality of auxiliary functions 110–113. Likewise, other components of one or more of the filters 200–203 may be integrated, for example, as a single circuit board. Other embodiments of the filter 200 and the plurality of filters 200–203 are also contemplated.

A return signal 550 issued by the peripheral device 100 over the ATA bus 131 for the host 120 is also illustrated in FIG. 5. The return signal 550 may be intercepted by the filter 200, and may preferably be stored in the buffer 510. The control logic 520 may determine whether the return signal 550 is formatted for the bus 130. For example, the return signal 550 may already be formatted for the ATA bus where the return signal 550 is issued by the peripheral device 100. As such, the filter 200 reissues the return signal 550 from the peripheral device 100 over the bus 130 to the host 120.

A return signal 555 issued by the auxiliary function 110 over the auxiliary bus 260 for the host 120 is also illustrated in FIG. 5. The return signal 555 may be intercepted by the filter 200, and may preferably be stored in the buffer 510. The control logic 520 may determine whether the return signal 555 is formatted for the ATA bus 130. The return signal 555 may instead be formatted for the auxiliary bus 260, for example, where the return signal 555 is issued by the auxiliary function 110. As such, the return signal 555 is formatted for the ATA bus 130 by the translator 540. Once formatted, the filter 200 reissues the return signal 555 from the auxiliary function over the ATA bus 130 to the host 120.

It is understood that according to other embodiments, the return signal 550 need not be intercepted or buffered by the filter 200. In such an embodiment, the return signal 550 may be issued directly to the host 120 via the bus 130. Likewise, where the translation or formatting function is not needed for the return signal 555 to be issued over the bus 130, the return signal 555 may also be issued directly to the host 120 via the bus 130 and need not be intercepted or buffered by the filter 200. For example, the translation function may not be needed where the bus 130 and the auxiliary bus 260 are based on the same bus technology (e.g., where both are ATA busses).

Preferably, when data has been requested from the auxiliary function 110, only the auxiliary function 110 is permitted to transfer data back (e.g., via the return signal 555) to the host 120 to fulfill that request. Likewise, when data has been requested from the peripheral device 100, only the peripheral device 100 is permitted to transfer data back (e.g., via the return signal 550) to the host 120 to fulfill that request. Preferably the peripheral device 100 and the auxiliary function 110 may issue an interrupt to the host 120 indicating completion of a task. Until a task is complete, the filter 200 does not reissue return signals 550, 555 from other auxiliary functions (e.g., 201, 202) or from the peripheral device 200, as the case may be.

Figure 6:
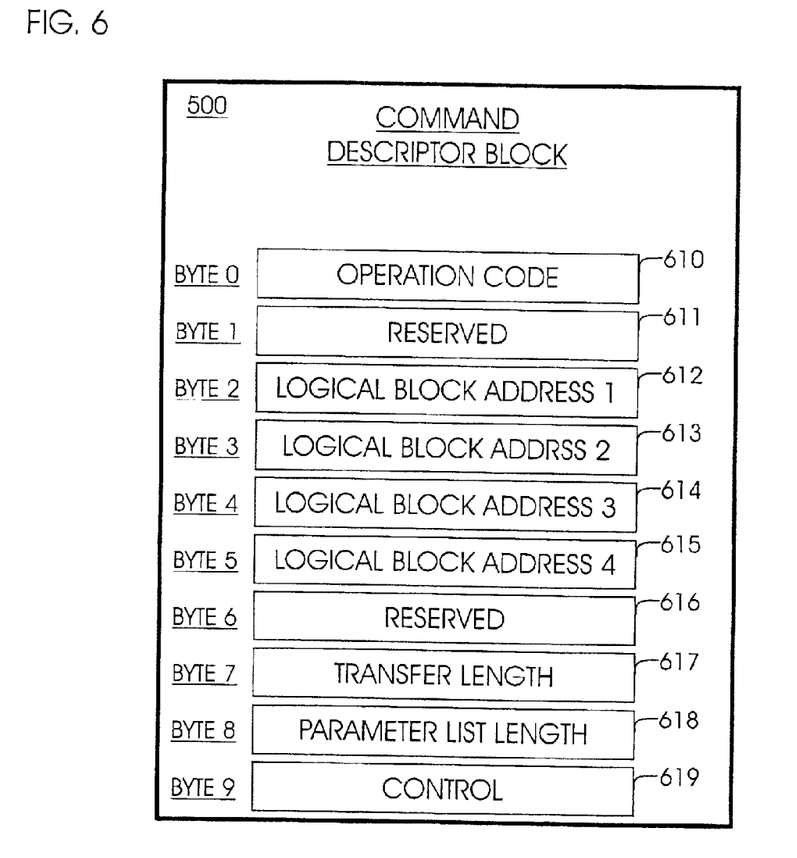
FIG. 6 is illustrative of an exemplary signal issued over the bus.

FIG. 6 is illustrative of an exemplary signal 500. The signal 500 is preferably a command descriptor block (CDB) as defined by the SCSI SPC-2 document and SCSI Architecture Model (SAM-2), and variations thereto. The signal 500 may comprise an operation code 610, reserved/service bytes 611, 616, logical block address bytes 612–615, transfer length and/or parameter list length bytes 617, 618, and a control byte 619.

Figure 7:
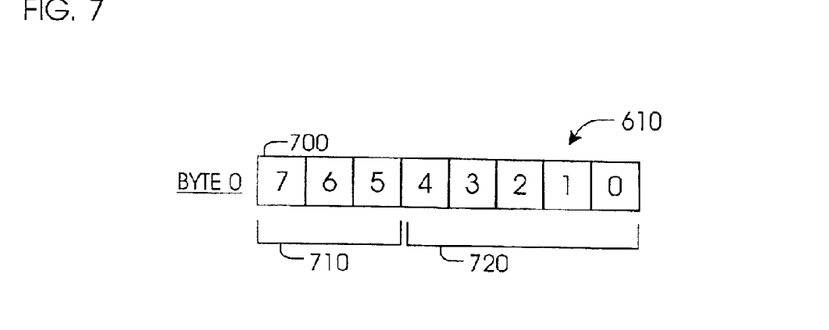
FIG. 7 is illustrative of an operation code of the exemplary signal shown in FIG. 6.

The operation code 610 of the CDB is shown in more detail in FIG. 7. The operation code 610 may comprise eight bits (each bit generally referred to as 700). The field comprising bits "7", "6", and "5" may be referred to as the group code value 710. The field comprising the remaining bits may be referred to as the command code 720. When bits "6" and "7" of the group code value 710 are both set to "one", then the command code 720 is vendor-specific (i.e., the command code 720 is function-specific). For example, when the group code value 710 is "110" or "111", a function specific command code 720 for a video capture and compression function may comprise instructions, such as, "play", "pause", "stop", and any other instructions necessary to control the auxiliary function 110. When bits "6" and "7" of the group code value 710 are not both set to "one", then the command code 720 is device-specific. For example, when the group code value 710 is "010", "000", "100", "011", "001", or "101", the device-specific command code 720 for a DVD+RW drive may comprise instructions such as "READ DVD STRUCTURE COMMAND", "READ TOC/PMA/ATIP COMMAND" and any other instructions necessary to control the peripheral device 100.

It is understood that the exemplary signal 500 shown and described with respect to FIG. 6 and FIG. 7 is merely illustrative of a signal issued by a host over an ATA bus. It is also understood that a return signal 550 issued by the peripheral device 100 may be similarly illustrated. Likewise, a return signal 555 issued by one of the auxiliary functions 200 may also be similarly illustrated, although it may be formatted for the auxiliary bus 260.

Figure 8:
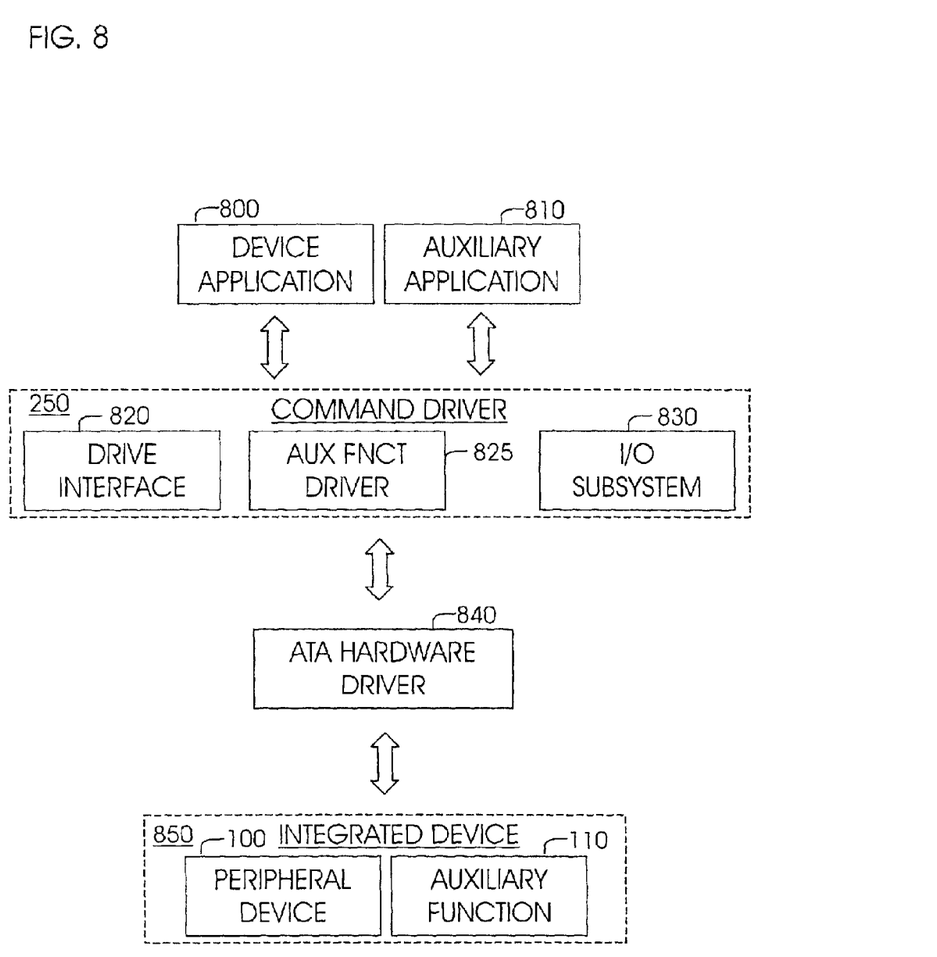
FIG. 8 is a process flow diagram illustrating the interaction of various components of the bus extension apparatus and method.

FIG. 8 is a process flow diagram illustrating an embodiment of the interaction of various components of the bus extension apparatus and method, as it may be used in a Microsoft WINDOWS® operating system environment. A device application 800 (e.g., computer readable program code) may reside on the host 120, for interfacing with the peripheral device 100. Likewise, an auxiliary application 810 (e.g., computer readable program code) may also reside on the host 120, for interfacing with the auxiliary function 110. Either the device application 800, or the auxiliary application 810, may issue an instruction that is passed to the command driver 250. For example, a user may issue an instruction (e.g., via a user interface) to write data to a DVD drive or to edit a menu for a DVD. Where the instruction is received from the device application 800 for the peripheral device 100, the device interface 820 builds a CDB and designates it as device-specific. For example, the drive interface 820 may set bits "6" and "7" of the group code 710 to "zero", and associate a device command code 720 therewith. Where the instruction is received from the auxiliary application 810 for the auxiliary function 110, the auxiliary function driver 825 builds a CDB and designates it as function-specific. For example, the auxiliary function driver 825 may set bits "6" and "7" of the group code value 710 to "one", and associate a vendor-defined command code 720 therewith. The command driver 250 may also comprise an Input/Output (I/O) subsystem 830 for handling all control commands, for example from Microsoft WINDOWS® Explorer. The I/O subsystem 830 may also synchronize access to the bus 130. The signal 500 may then be issued via the ATA hardware driver 840 (e.g., an ATA bus low-level logical driver), via the bus 130 to the peripheral device 100 or the auxiliary function 110, as discussed above.

It is understood that the process flow diagram of FIG. 8 is not intended to limit the invention thereto. Instead, the embodiment of FIG. 8 are provided as exemplary of an implementation of the bus extension apparatus and method for use with a Microsoft WINDOWS® operating system. Modifications and variations thereto, for both the Microsoft WINDOWS® operating system, and other operating systems, are also contemplated as being within the scope of the invention.

Also as shown in FIG. 8, the peripheral device 100 and the auxiliary function 110 are preferably housed together as an integrated device 850. That is, the hardware for both the auxiliary function 110 and the peripheral device 100 may be housed together with a single ATA connection for linking the peripheral device 100 and the auxiliary function 110 to the host 120. It is understood that although the integrated device 850 is preferably housed for installation as an internal, or partly internal device for the host 120, the integrated device 850 may also be housed as an external device.

Figure 9:
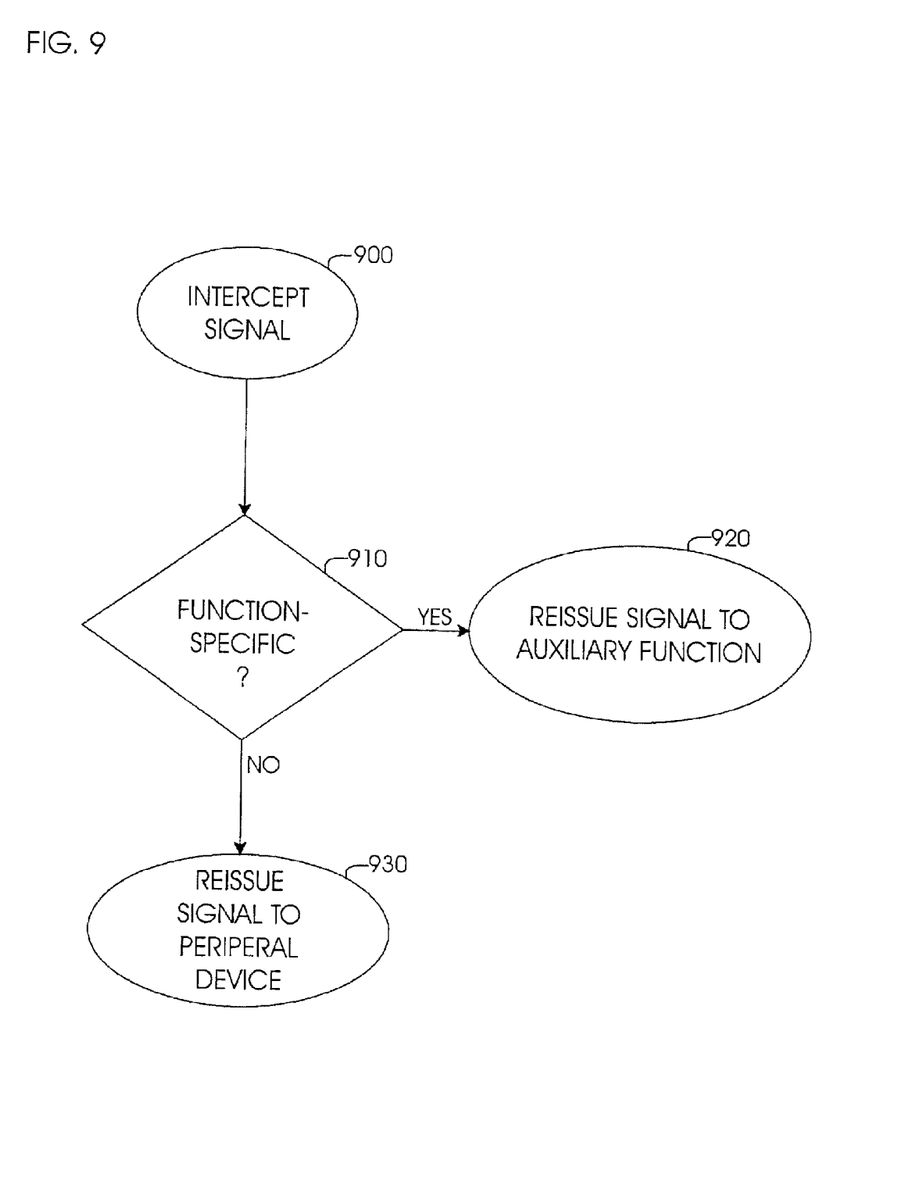
FIG. 9 is a flow chart illustrating the steps of an embodiment of a method for extending a bus for interfacing between a host and a peripheral device to support at least one auxiliary function.

FIG. 9 is a flow chart illustrating the steps of an embodiment of a method for extending a bus 130, 135 for interfacing between a host 120 and a peripheral device 100 to support at least one auxiliary function 110. In step 900, the signal 500 may be intercepted. For example, the signal 500 may be issued over the bus 130 by the host 120 and intercepted by the filter 200 (e.g., by buffer 510). In step 910, a determination is made (e.g., by control logic 520) as to the destination of the signal 500. For example, the operation code 610 may designate the signal 500 as device-specific, and thus the destination for the signal 500 is the peripheral device 100. As such, the signal 500 may be reissued over the ATA bus 131 to the peripheral device 100, in step 920. Alternately, the operation code 610 may designate the signal 500 as function-specific, and thus the destination for the signal 500 is an auxiliary function 110. As such, the signal 500 may be reissued to the auxiliary function 110 (e.g., over the auxiliary bus 260), in step 930.

It is understood that the steps shown and described with respect to FIG. 9 are merely illustrative of embodiments of a method of the invention, and are not intended to limit the scope of the invention thereto. For example, other steps may include intercepting the signal 500 after it has been reissued to one of the auxiliary functions in step 920, and routing it to one of a plurality of other auxiliary functions 110–113, as described above with respect to FIG. 3 and FIG. 4. As another example, in step 920 the signal 500 may initially be routed to one of a plurality of auxiliary functions 110–113. Other embodiments are also contemplated as being within the scope of the invention.

What is claimed is:

1. A method for extending a bus to support at least one auxiliary function, comprising:

intercepting a signal issued over said bus;

reissuing said intercepted signal to one of said at least one auxiliary function when said intercepted signal is designated as function-specific;

reissuing said intercepted signal over said bus to a peripheral device when said signal is designated as device-specific; and formatting for the bus said intercepted signal when said intercepted signal is to be reissued to said one of said at least one auxiliary function.

2. A method as in claim 1, further comprising reading an operation code of said intercepted signal, wherein said operation code designates said intercepted signal.

3. A method as in claim 1, further comprising:

intercepting said reissued signal; and reissuing said intercepted reissued signal again based on a designated destination thereof.

4. A method as in claim 1, further comprising determining a destination for said intercepted signal based on a designation of said intercepted signal.

5. An apparatus for extending a bus to support at least one auxiliary function, comprising:

at least one filter for intercepting and routing a signal issued over said bus, said at least one filter comprising:

a) control logic for reading said intercepted signal and for determining a destination therefor;

b) a multiplexer operatively associated with said control logic for reissuing said intercepted signal to said destination, said multiplexer reissuing said intercepted signal to one of said at least one auxiliary function when said intercepted signal is designated as function-specific, and said multiplexer reissuing said intercepted signal over said bus to a peripheral device when said intercepted signal is designated as device-specific; and c) a translator operatively associated with said multiplexer, said translator formatting for the bus said intercepted signal when said intercepted signal is to be reissued to said one of said at least one auxiliary function.

6. An apparatus as in wherein said bus is an ATA bus.

7. An apparatus as in claim 5, wherein one of said at least one filter comprises a buffer for intercepting said signal.

8. An apparatus as in claim 5, wherein said one of said at least one auxiliary function is another peripheral device.

9. An apparatus as in claim 5, wherein said one of said at least one auxiliary function is an associated function of said peripheral device.

10. An apparatus as in claim 5, wherein said multiplexer reissues said intercepted signal to one of said at least one auxiliary function via a microcontroller bus.

11. An apparatus as in claim 5, wherein at least one of said at least one filter is in series on said bus.

12. An apparatus as in claim 5, wherein at least one of said at least one filter is in series on an auxiliary bus.

13. An apparatus as in claim 5, wherein said multiplexer reissues said intercepted signal to one of a plurality of destinations.

14. An apparatus as in claim 5, further comprising a command driver for designating said destination for said signal.

15. An apparatus as in claim 5, wherein said at least one auxiliary function is housed together with said peripheral device.

16. A filter for extending a bus to support at least one auxiliary function, comprising:

control logic for reading a signal issued over said bus, and for determining a destination for said signal;

a multiplexer for reissuing said signal to said destination, wherein said destination is one of said at least one auxiliary function when said signal is designated as function-specific, and wherein said destination is a peripheral device when said signal is designated as device-specific; and a translator operatively associated with said multiplexer, said translator formatting for the bus said intercepted signal when said intercepted signal is to be reissued to said one of said at least one auxiliary

17. A filter as in claim 16, further comprising a buffer for intercepting said signal.

* * * * *